United States Patent
Taoka et al.

(10) Patent No.: US 8,861,630 B2
(45) Date of Patent: Oct. 14, 2014

(54) RECEPTION APPARATUS AND RECEPTION METHOD FOR IMPROVING MIMO TRANSMISSION

(75) Inventors: Hidekazu Taoka, Tokyo (JP); Mamoru Sawahashi, Tokyo (JP)

(73) Assignee: NTT DoCoMo, Tokyo (JP)

(*) Notice: Subject to any disclaimer, the term of this patent is extended or adjusted under 35 U.S.C. 154(b) by 0 days.

(21) Appl. No.: 13/505,797

(22) PCT Filed: Oct. 21, 2010

(86) PCT No.: PCT/JP2010/068593
§ 371 (c)(1),
(2), (4) Date: Jun. 13, 2012

(87) PCT Pub. No.: WO2011/062025
PCT Pub. Date: May 26, 2011

(65) Prior Publication Data
US 2012/0243644 A1   Sep. 27, 2012

(30) Foreign Application Priority Data
Nov. 19, 2009   (JP) .................. 2009-263958

(51) Int. Cl.
*H04B 7/02* (2006.01)
*H04L 27/06* (2006.01)
*H04B 7/04* (2006.01)
*H04L 25/03* (2006.01)
*H04J 11/00* (2006.01)

(52) U.S. Cl.
CPC ............ *H04J 11/004* (2013.01); *H04B 7/0413* (2013.01); *H04L 25/03898* (2013.01); *H04L 2025/03414* (2013.01); *H04L 25/0328* (2013.01)
USPC .......................................... 375/267; 375/341

(58) Field of Classification Search
USPC .................. 375/267, 341, 261, 259, 340, 316
See application file for complete search history.

(56) References Cited

U.S. PATENT DOCUMENTS

| | | | | |
|---|---|---|---|---|
| 2009/0110033 A1* | 4/2009 | Shattil | ............................ | 375/141 |
| 2009/0292966 A1* | 11/2009 | Liva et al. | ...................... | 714/752 |
| 2009/0312042 A1* | 12/2009 | Rudrapatna | .................... | 455/501 |

FOREIGN PATENT DOCUMENTS

| | | |
|---|---|---|
| JP | 2007-124600 A | 5/2007 |
| JP | 2008-124843 A | 5/2008 |
| WO | 2009/041067 A1 | 4/2009 |

OTHER PUBLICATIONS

Intel Corporation, "MLD vs. SIC complexity analysis for 2×2 MIMO OFDM," 3GPP TSG-RAN WG1 #46, R1-061965, Tallinn, Estonia, Aug. 28, 2006 (6 pages).*

3GPP TS 36.211 V8.6.0, Mar. 2009, "3rd Generation Partnership Project; Technical Specification Group Radio Access Network; Evolved Universal Terrestrial Radio Access (E-UTRA); Physical Channels and Modulation (Release 8)," (83 pages).

(Continued)

*Primary Examiner* — Chieh M Fan
*Assistant Examiner* — Brian J Stevens
(74) *Attorney, Agent, or Firm* — Osha Liang LLP

(57) ABSTRACT

The present invention provides a reception apparatus and reception method that reduce the amount of operation processing, reduce the processing delay and allow high signal separation performance. The reception method of the present invention is characterized by receiving signals including a plurality of codewords transmitted by a plurality of streams and performing maximum likelihood detection-based signal separation in the same codeword in the received signals while performing continuous interference canceller-based signal separation between different codewords.

6 Claims, 6 Drawing Sheets

(56) References Cited

OTHER PUBLICATIONS

K. J. Kim et al., "A QRD-M/Kalman filter-based detection and channel estimation algorithm for MIMO-OFDM systems", IEEE Trans. on Wireless Commun., vol. 4, No. 2, pp. 710-721, Mar. 2005 (12 pages).

Maeda, Higuchi, Kawai, and Sawahashi, "Sphere Decoding Using Adaptive Selection of Surviving Symbol Replica Candidates for OFDM MIMO Multiplexing," (Abstract) The Institute of Electronics Information and Communication Engineers, IEICE Technical Report, RCS2004-222, pp. 67-72, Nov. 2004 (1 page).

International Search Report issued in PCT/JP2010/068593, mailed on Nov. 22, 2010, 2 pages.

Japanese Office Action issued in Japanese Patent Application No. 2009-263958, mailing date Jul. 2, 2013, with English translation thereof (4 pages).

* cited by examiner

RECEPTION APPARATUS AND RECEPTION METHOD FOR IMPROVING MIMO TRANSMISSION

TECHNICAL FIELD

The present invention relates to a reception apparatus and a reception method in a next generation mobile communication system.

BACKGROUND ART

The LTE (Long Term Evolution) system defined by 3GPP (3rd Generation Partnership Project) employs MIMO (Multiple Input Multiple Output) transmission, which uses a plurality of transmission/reception antennas in a radio base station apparatus, to realize higher speed transmissions. Using this MIMO transmission, it is possible to perform scheduling in the space domain, in addition to scheduling in the time domain•frequency domain. MIMO transmission includes single-user MIMO (SU-MIMO) which transmits a plurality of signals from a radio base station apparatus having a plurality of antennas, to a single user (mobile terminal apparatus), in a parallel fashion, and multi-user MIMO (MU-MIMO) which performs transmission by applying space multiplexing to a plurality of users (mobile terminal apparatuses), from a radio base station apparatus having a plurality of antennas (SDMA: Space Division Multiple Access).

SU-MIMO is a method of transmitting different data from a plurality of transmission antennas of a transmitter, separating the data in a receiver into signals from the respective transmission antennas, and demodulating these signals. That is to say, as illustrated in FIG. 1, in the transmitter, different data having been processed in separate transmission circuits 1 to $N_{TX}$ is transmitted as transmission signals from separate antennas 1 to $N_{TX}$. The signals having past the propagation path are received by separate antennas 1 to $N_{RX}$. At this time, different data is in a state of being mixed up. At the receiver, the data is received by separate antennas, and the data processed in reception circuits 1 to $N_{RX}$ is subjected to signal separation in a signal separation section, and different data is demodulated (non-patent literature 1).

As for the method of separating signals in the receiver, there are a signal separation method (MMSE method) by the MMSE (Minimum Mean Square Error) algorithm which minimizes interference and noise power, a method of separating signals by repeating removing replicas of the stream of the best quality in a cascade fashion from a received signal by space filtering (SIC (Successive Interference Canceller) method), and a method of calculating replicas of received signal points, using channel information, with respect to all possible combinations of transmission signals, and finding the closest point among them (MLD (Maximum Likelihood Detection) method).

CITATION LIST

Non-Patent Literature

Non-Patent Literature 1: 3GPP, TS36.211 (V8.6.0), "Evolved Universal Terrestrial Radio Access (E-UTRA); Physical Channels and Modulation," March, 2009.

SUMMARY OF INVENTION

Technical Problem

With the MMSE method, although the amount of operation processing (power consumption) is very small, the accuracy of signal separation is relatively low. The MLD method enables signal separation performance and parallel processing (processing that makes continuous processing (serial processing) like SIC unnecessary) and therefore is preferable for a signal separation method. However, as the number of antennas (the number of streams) increases, the amount of operation processing (power consumption) also increases, and this makes actual application difficult. On the other hand, from the perspective of the amount of operation processing, although the SIC method can keep the amount of operation processing low compared to the MLD method, the performance of signal separation is poor compared to the MLD method. Furthermore, since serial processing is fundamentally required, as the number of antennas increases, the processing delay also increases.

The present invention has been made taking into account the above points, and it is therefore an object of the present invention to provide a reception apparatus and reception method that reduce the amount of operation processing, reduce the process delay, and allow high signal separation performance.

Solution to Problem

The reception apparatus of the present invention is characterized by having: a reception section configured to receive signals including a plurality of codewords transmitted by a plurality of streams; and a signal separation section configured to separate the codewords from the received signals, and this signal separation section has: a maximum likelihood detection signal separation section configured to perform maximum likelihood detection-based signal separation in a same codeword; and a continuous interference canceller signal separation section configured to perform continuous interference canceller-based signal separation between different codewords.

The reception method of the present invention is characterized by having: a reception step of receiving signals including a plurality of codewords transmitted by a plurality of streams; and a signal separation step of separating the codewords from the received signals, and this signal separation step has: a maximum likelihood detection signal separation step of performing maximum likelihood detection-based signal separation in a same codeword; and a continuous interference canceller signal separation step of performing continuous interference canceller-based signal separation between different codewords.

Technical Advantageous Effects of Invention

The present invention is designed to receive signals including a plurality of codewords transmitted by a plurality of streams, and perform maximum likelihood detection-based signal separation in the same codeword in the received signals while performing continuous interference canceller-based signal separation between different codewords, so that it is possible to reduce the amount of operation processing, reduce the processing delay and allow high signal separation performance.

DESCRIPTION OF EMBODIMENTS

On the downlink of the LTE system, MIMO multiplexing transmission with maximum four streams is performed. Also, in the LTE-Advanced (LTE-A) system which is directed to further broad-bandization and higher speed than the LTE system, MIMO multiplexing transmission with maximum eight streams is performed on the downlink and MIMO multiplexing transmission with maximum four streams is performed on the uplink. However, given the tradeoff relationship between control signal overhead and performance, the maximum number of codewords (the number of transport blocks (TBs)) during MIMO multiplexing transmission is limited to two. A codeword serves as the unit of adaptive radio link control (AMC: Adaptive Modulation and Coding) and retransmission control (HARQ: Hybrid ARQ).

Figure 1:
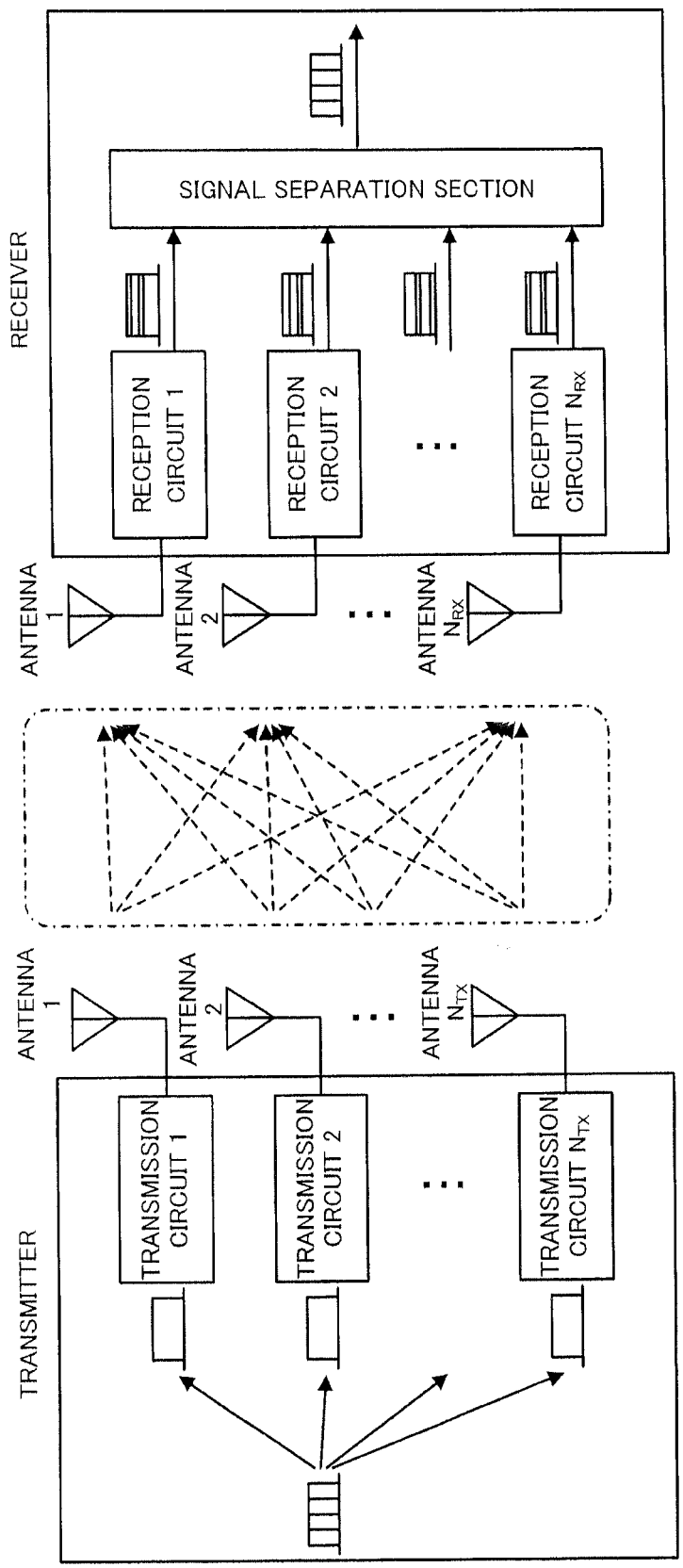
FIG. 1 is a drawing for explaining single user MIMO.
Figure 2:
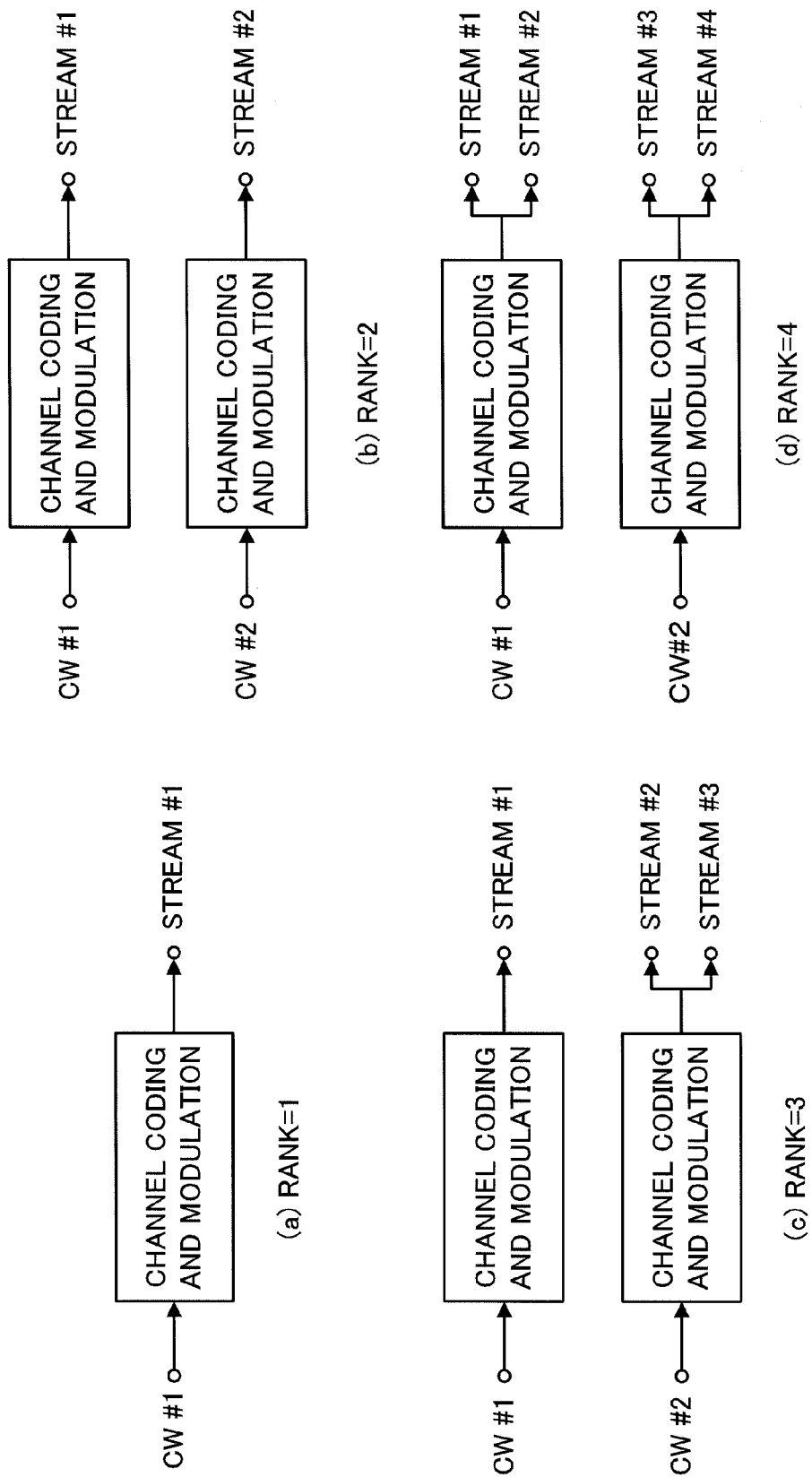
FIGS. 2(a) to (d) are drawings for explaining the relationship between codewords and the number of streams.

For example, in the event of rank 1 (one-stream transmission), as illustrated in FIG. 2(a), codeword (CW) #1 is subjected to channel coding and modulation, and then transmitted by stream #1. Also, in the event of rank 2 (two-stream transmission), as illustrated in FIG. 2(b), CW #1 and CW #2 are separately subjected to channel coding and modulation, and then transmitted by stream #1 and stream #2, respectively. Also, in the event of rank 3 (three-stream transmission), as illustrated in FIG. 2(c), CW #1 and CW #2 are separately subjected to channel coding and modulation, and then CW #1 is transmitted by stream #1, while CW #2 is transmitted by stream #2 and stream #3. Furthermore, in the event of rank 4 (four-stream transmission), as illustrated in FIG. 2(d), CW #1 and CW #2 are separately subjected to channel coding and modulation, and then CW #1 is transmitted by stream #1 and stream #2, while CW #2 is transmitted by stream #3 and stream #4.

The present inventors have noted the fact that the maximum number of streams and the number of codewords are different, that is, the fact that the number of codewords is set lower than the maximum number of streams. Then, the present inventors have arrived at the present invention by finding out using SIC-based signal separation, which is serial processing, between codewords that are fewer than the maximum number of streams and reducing the amount of operation processing and processing delay, and performing signal separation with high accuracy using MLD-based signal separation with respect to the same codewords.

That is to say, an essence of the present invention is to reduce the amount of operation processing, reduce the processing delay, and allow signal separation performance by receiving signals including a plurality of codewords transmitted by a plurality of streams, and performing maximum likelihood detection-based signal separation in the same codeword in the received signals while performing continuous interference canceller-based signal separation between different codewords (hybrid MIMO signal separation).

Figure 3:
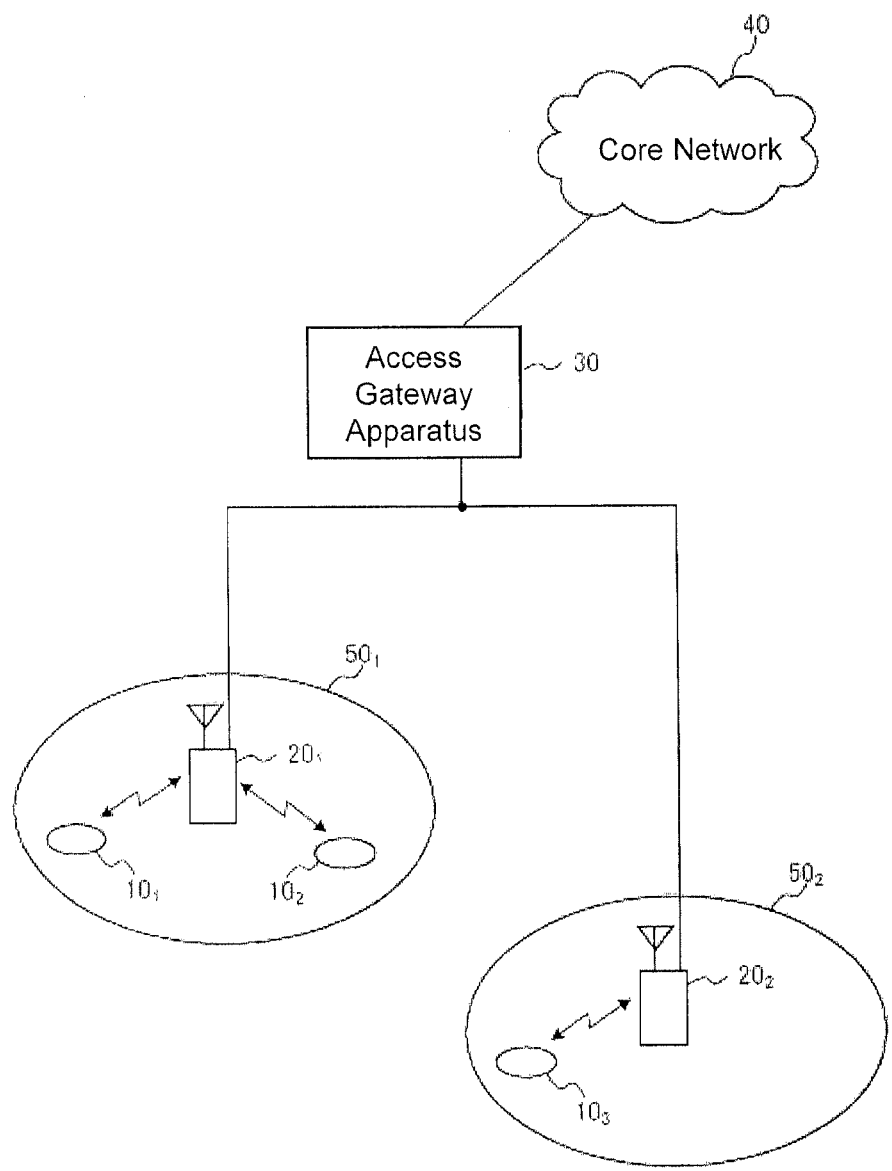
FIG. 3 is a drawing illustrating a radio communication system having radio base station apparatuses and mobile terminal apparatuses.

Now, embodiments of the present invention will be described below in detail with reference to the accompanying drawings. FIG. 3 is a drawing illustrating a radio communication system having mobile terminal apparatuses and radio base station apparatuses, in an LTE system or LTE-A system.

The radio communication system is, for example, a system adopting E-UTRA (Evolved UTRA and UTRAN). The radio communication system has a radio base station apparatus (eNB: eNodeB) $20_n$ ($20_1$, $20_2$, ... $20_n$, where n is an integer to satisfy n>0) and a plurality of mobile terminal apparatuses (UEs) $10_n$ ($10_1$, $10_2$, $10_3$, ... $10_n$, where n is an integer to satisfy n>0) that communicate with the base station apparatus 20. The base station apparatus 20 is connected with, for example, an access gateway apparatus 30, and the access gateway apparatus 30 is connected with a core network 40. The mobile terminal apparatuses $10_n$ communicate with the radio base station apparatus 20 by E-UTRA in cells 50 ($50_1$ and $50_2$). Although two cells are illustrated with this embodiment, the present invention is equally applicable to three or more cells. Note that the mobile terminal apparatuses ($10_1$, $10_2$, $10_3$, ... $10_n$) have the same configuration, functions and state, so that, the following descriptions will be given with respect to "mobile terminal apparatus 10," unless specified otherwise.

In the radio communication system, for radio access schemes, OFDM (Orthogonal Frequency Division Multiple Access) is employed on the downlink, and SC-FDMA (Single-Carrier Frequency Division Multiple Access) is employed on the uplink. OFDM is a multi-carrier transmission scheme to perform communication by dividing a frequency band into a plurality of narrow frequency bands (sub-carriers) and mapping data on each frequency band. SC-FDMA is a single-carrier transmission scheme to reduce interference between terminals by dividing a frequency band per terminal and allowing a plurality of terminals to use mutually different frequency bands.

Now, a communication channel in E-UTRA will be explained. On the downlink, a downlink shared channel used by each mobile terminal apparatus $10_n$ on a shared basis, and a downlink control channel are used. A downlink control channel is also referred to as a downlink L1/L2 control channel. By this downlink shared channel, user data, that is to say, normal data signals, is transmitted. Also, by the downlink control channel, downlink scheduling information, retransmission response signal (ACK/NACK), uplink scheduling grant (UL scheduling grant), TPC command (Transmission Power Control command), and so on are transmitted. The downlink scheduling information includes, for example, the ID of a user communicating using a downlink shared channel, information about that user's data transport format, that is, data size, modulation scheme, information related to retransmission control (HARQ), downlink resource block assignment information, and so on.

Furthermore, the above uplink scheduling grant includes, for example, the ID of a user communicating using an uplink shared channel, information about that user's data transport format, that is, data size, information about the modulation scheme, uplink resource block assignment information, information about the transmission power of the uplink shared channel, and so on. Here, an uplink resource block is equivalent to a frequency resource and may be referred to as a resource unit.

On the uplink, an uplink shared channel used by each mobile terminal apparatus $10_n$ on a shared basis, and a downlink control channel are used. By this uplink shared channel, user data, that is to say, normal data signals, is transmitted. Also, by the uplink control channel, downlink quality information to use for shared channel scheduling processing and adaptive modulation/demodulation and coding processing on the downlink, and retransmission response signals for the downlink shared channel are transmitted.

In the uplink control channel, in addition to CQI and retransmission response signals, a scheduling request for requesting uplink shared channel resource allocation, a release request for persistent scheduling and so on may be transmitted. Here, uplink shared channel resource allocation means that a radio base station apparatus reports to a mobile terminal apparatus that communication may be performed using an uplink shared channel in subsequent subframes, using a downlink control channel in a certain subframe.

The mobile terminal apparatus $10_n$ communicates with an optimal radio base station apparatus. In the example illustrated in FIG. 3, mobile terminal apparatuses $10_1$ and $10_2$ communicate with a radio base station apparatus $20_1$ and a mobile terminal apparatus $10_3$ communicates with a radio base station apparatus $20_2$. The present invention is applicable to the receiver in the radio base station apparatuses $20_n$ or mobile terminal apparatuses $10_n$ described above.

Embodiment 1

With the present embodiment, maximum likelihood detection (MLD)-based signal separation is performed in a given CW, and continuous interference canceller (SIC)-based signal separation is performed between CWs. A case will be described here where the number of CWs is two.

Figure 4:
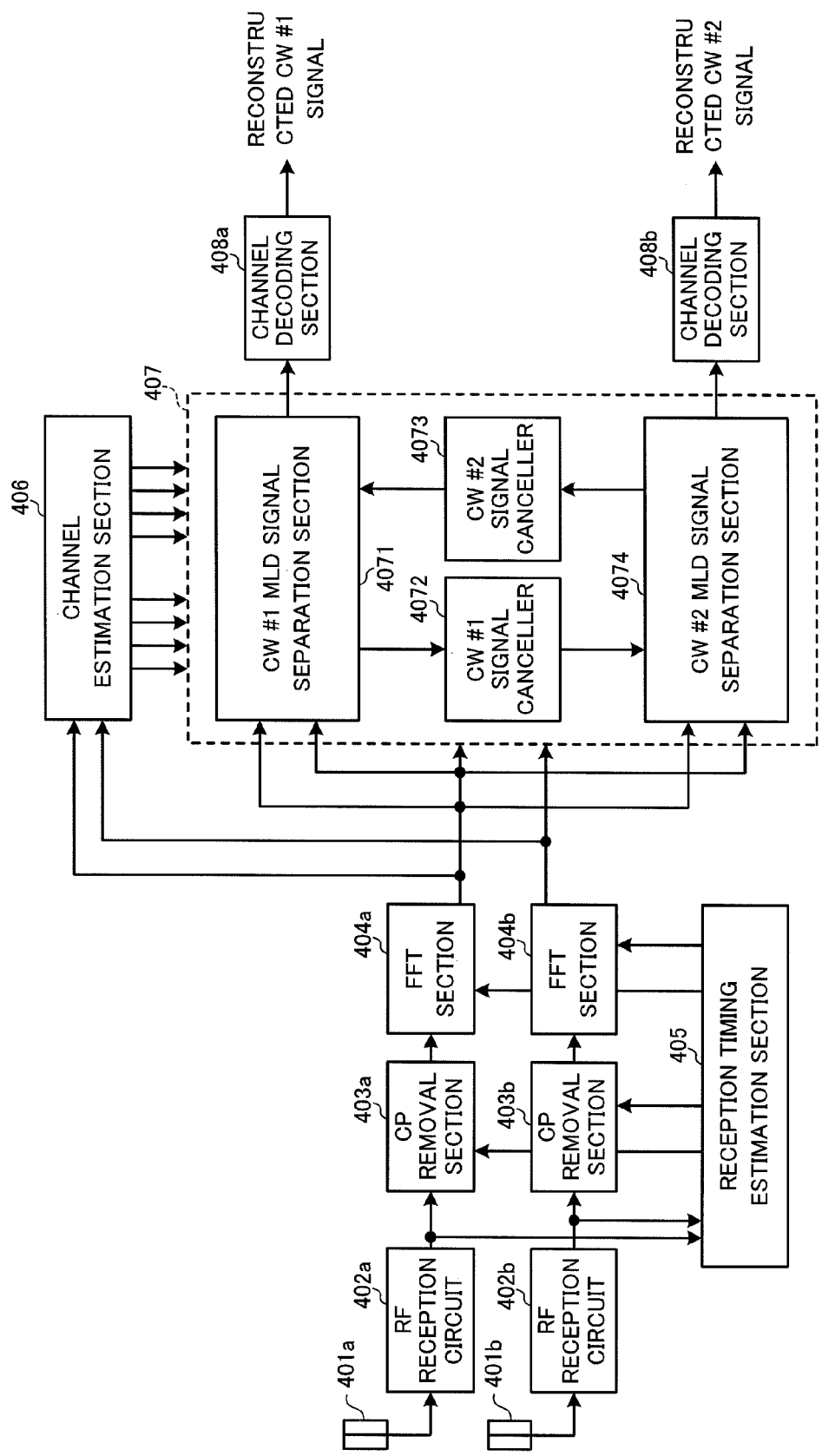
FIG. 4 is a drawing illustrating a schematic configuration of a reception apparatus according to embodiment 1 of the present invention.

FIG. 4 is a drawing illustrating a schematic configuration of a reception apparatus according to embodiment 1 of the present invention. The reception apparatus illustrated in FIG. 4 is comprised mainly of antennas 401a and 401b, RF reception circuits 402a and 402b, CP (Cyclic Prefix) removal sections 403a and 403b, Fast Fourier Transform (FFT) sections 404a and 404b, a reception timing estimation section 405, a channel estimation section 406, a signal separation section 407, and channel decoding sections 408a and 408b. Here, a signal including CW #1 is received via the antenna 401a, and a signal including CW #2 is received via the antenna 401b.

The signal separation section 407 performs processing of separating the CWs from the received signals. The signal separation section 407 has a CW #1 MLD signal separation section 4071 that performs MLD-based signal separation in CW #1, a CW #1 signal canceller 4072 that performs SIC-based signal separation between CWs, a CW #2 signal canceller 4073 that performs SIC-based signal separation between CWs, and a CW #2 MLD signal separation section 4074 that performs MLD-based signal separation in CW #2. Although one signal separation section 407 is illustrated in FIG. 4 for ease of description, but in fact signal separation section 407 is provided for every subcarrier.

The RF reception circuits 402a and 402b receive signals including a plurality of CWs transmitted by a plurality of streams, via antennas 401a and 401b, respectively, and perform reception processing. That is to say, the RF reception circuit 402a amplifies the signal received via the antenna 401a, down-converts the resulting signal into a baseband signal, and filters the baseband signal through a low-pass filter. The RF reception circuit 402a outputs the baseband signal to the CP removal section 403a. That is to say, the RF reception circuit 402b amplifies the signal received via the antenna 401b, down-converts the resulting signal into a baseband signal, and filters the baseband signal through a low-pass filter. The RF reception circuit 402b outputs the baseband signal to the CP removal section 403b. Furthermore, each baseband signal is output to the reception timing estimation section 405.

The CP removal sections 403a and 403b remove the CP from the received signals. That is to say, based on the reception timing from the reception timing estimation section 405, the CP removal section 403a removes the CP from the received signal output from RF reception circuit 402a. The CP removal section 403a outputs the signal after the CP removal to the FFT section 404a. Also, based on the reception timing from the reception timing estimation section 405, the CP removal section 403b removes the CP from the received signal output from RF reception circuit 402b. The CP removal section 403b outputs the signal after the CP removal to the FFT section 404b.

The FFT sections 404a and 404b perform an FFT on the signals after the CP removal, and convert them into frequency domain signals. That is to say, based on the reception timing from the reception timing estimation section 405, the FFT section 404a performs an FFT on the signal output from the CP removal section 403a and converts this signal into a frequency domain signal. The FFT section 404a outputs the signal after the FFT to the channel estimation section 406 and the signal separation section 407. Also, based on the reception timing from the reception timing estimation section 405, the FFT section 404b performs an FFT on the signal output from the CP removal section 403b and converts this signal into a frequency domain signal. The FFT section 404b outputs the signal after the FFT to the channel estimation section 406 and the signal separation section 407.

The reception timing estimation section 405 estimates the reception timings of the received signals from the baseband signals from the RF reception circuits 402a and 402b. That is to say, the reception timing estimation section 405 estimates the reception timing of the signal received in the antenna 401a based on the baseband signal from the RF reception circuit 402a and outputs its estimated value to the CP removal section 403a and FFT section 404a. Also, the reception timing estimation section 405 estimates the reception timing of the signal received in the antenna 401b based on the baseband signal from the RF reception circuit 402b and outputs its estimated value to the CP removal section 403b and FFT section 404b.

The channel estimation section 406 acquires channel estimated values (channel gains) using reference signals included in the received signals. The channel estimation section 406 outputs the acquired channel estimated values to the signal separation section 407. That is to say, the channel estimation section 406 performs channel estimation using the reference signal in the signal received via the antenna 401a, and outputs the acquired channel estimated value to the CW #1 MLD signal separation section 4071. Also, the channel estimation section 406 performs channel estimation using the reference signal in the signal received via the antenna 401b, and outputs the acquired channel estimated value to the CW #2 MLD signal separation section 4074.

The CW #1 MLD signal separation section 4071 performs maximum likelihood detection with the CW #1 signal after the FFT. That is to say, from symbol phases of all patterns of CW #1 and the channel estimated values acquired in the channel estimation section 406, the CW #1 MLD signal separation section 4071 generates symbol replicas for each pattern. Then, the CW #1 MLD signal separation section 4071 calculates the Euclidean distances between the symbol replicas of each pattern and the CW #1 signal after the FFT, adds up the Euclidean distances calculated with respect to all symbols as a metric, and reconstructs the symbol replicas that make the cumulative metric the minimum as the CW #1 signal. This CW #1 signal is output to the channel decoding section 408a. The channel decoding section 408a reconstructs the CW #1 signal by performing channel decoding on the CW #1 signal after MLD. Furthermore, the CW #1 MLD signal separation section 4071 outputs the CW #1 signal after MLD to the CW #1 signal canceller 4072.

The CW #1 signal canceller 4072 removes the CW #1 signal acquired from CW #1 MLD signal separation section 4071, from the signal received via the antenna 401a and the signal received via the antenna 401b. The CW #1 signal canceller 4072 outputs the signal from which the CW #1 signal has been removed, to CW #2 MLD signal separation section 4074.

The CW #2 MLD signal separation section 4074 performs maximum likelihood detection with the CW #2 signal after the FFT. That is to say, from symbol phases of all patterns of CW #2 and the channel estimated values acquired in the channel estimation section 406, the CW #2 MLD signal separation section 4074 generates symbol replicas for each pattern. Then, the CW #2 MLD signal separation section 4074 calculates the Euclidean distances between the symbol replicas of each pattern and the CW #2 signal after the FFT, adds up the Euclidean distances calculated with respect to all symbols as a metric, and reconstructs the symbol replicas that make the cumulative metric the minimum as the CW #2 signal. This CW #2 signal is output to the channel decoding section 408b. The channel decoding section 408b reconstructs the CW #2 signal by performing channel decoding on the CW #2 signal after MLD.

In this way, in the reception apparatus of the above configuration, signals including a plurality of CWs (here CW #1 and CW #2) transmitted by a plurality of streams are received, and MLD is performed in the same CW and SC is performed between different CWs.

A case has been shown in the above description where a CW #1 signal having been subjected to an FFT is subjected to maximum likelihood detection in the CW #1 MLD signal separation section 4071, the CW #1 signal is removed from signals received via the antennas 401a and antenna 401b, and, after that, a CW #2 signal after an FFT is subjected to maximum likelihood detection. The present embodiment is by no means limited to this, and it is equally possible to subject a CW #2 signal having been subjected to an FFT to maximum likelihood detection in the CW #2 MLD signal separation section 4074, remove the CW #2 signal from signals received via the antennas 401a and antenna 401b, and, after that, subject a CW #1 signal after an FFT to maximum likelihood detection. In this case, for example, settings are provided to perform MLD preferentially for CWs of high reception quality.

In this way, the reception apparatus according to the present embodiment receives signals including a plurality of CWs transmitted by a plurality of streams, and performs maximum-likelihood detection-based signal separation in the same CW in the received signals while performing continuous interference canceller-based signal separation between different CWs, so that it is possible to reduce the amount of operation processing, reduce the processing delay and allow high signal separation performance. That is to say, in CWs, signal separation of the highest accuracy is made possible by means of MLD processing (parallel processing), while, between CWs, by applying a canceller, the amount of operation processing is kept low compared to the case of signal separation all by MLD processing. By this means, it is possible to realize reduction of the amount of operation processing and high performance in a good balance. Although cases might occur where, due to application of an SIC canceller, differences in reception quality are created between CWs, it is still possible to compensate for such differences by AMC or HARQ control in CW units. As a result of this, by associating CWs and hybrid MIMO signal separation, it is possible to improve throughput efficiently.

Note that, for MLD processing, symbol replicas of all patterns of a CW are generated, and the correlations between the symbol replicas of each pattern and a CW signal after an FFT are subjected to in-phase addition averaging over a predetermined symbol period. It is equally possible to use joint MLD processing which reconstructs the symbol replicas that give the greatest correlation peak after in-phase addition averaging, as a CW signal.

Embodiment 2

A case will be described below with the present embodiment where when, after maximum likelihood detection-based signal separation is performed with respect to a certain CW and there is no frame error after channel decoding, continuous interference canceller-based signal separation is performed using its hard decision decoding result, and, after that, maximum likelihood detection-based signal separation is performed with respect to another CW. A case will be described here where the number of CWs is two.

Figure 5:
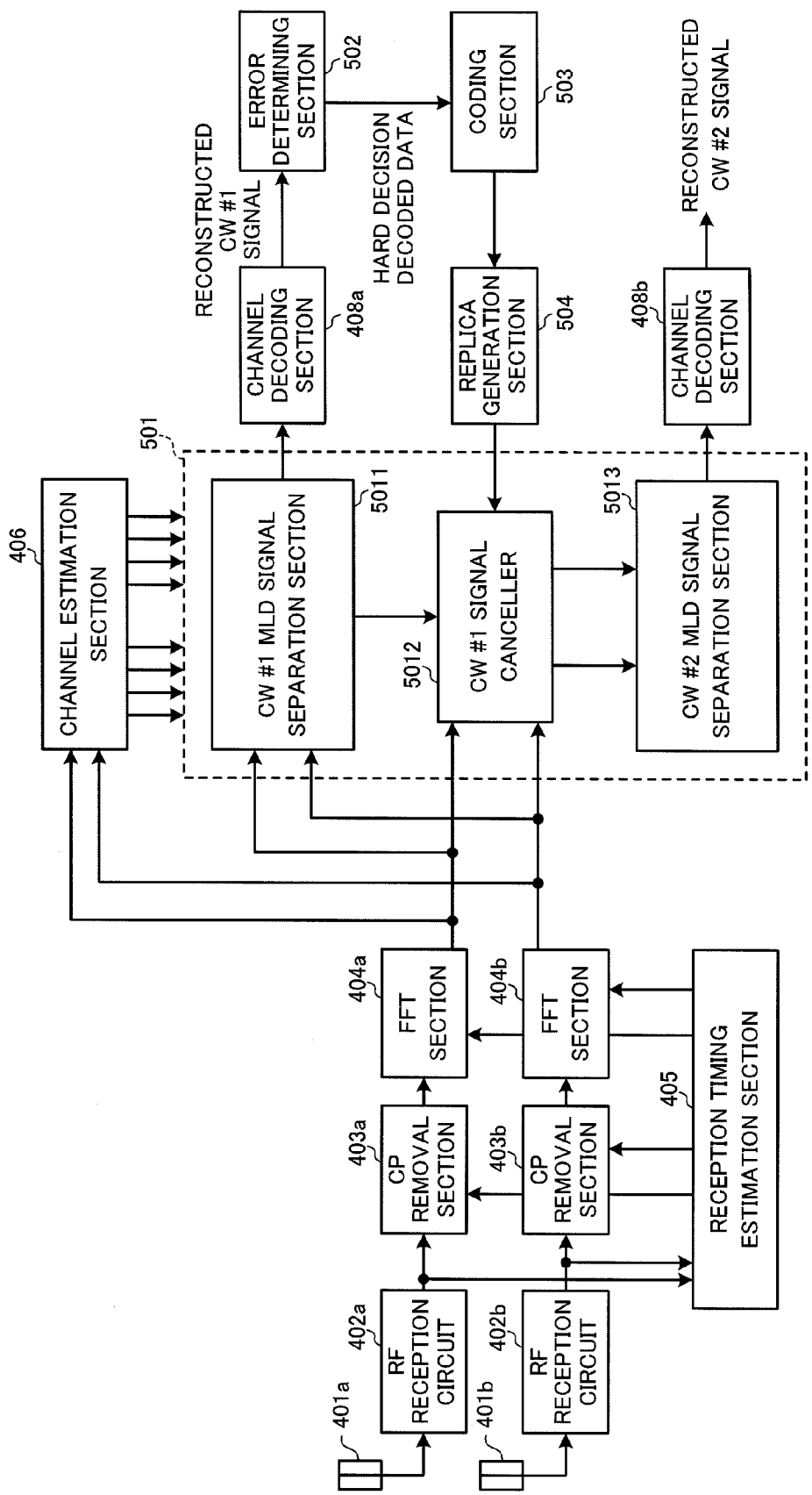
FIG. 5 is a drawing illustrating a schematic configuration of a reception apparatus according to embodiment 2 of the present invention.

FIG. 5 is a drawing illustrating a schematic configuration of a reception apparatus according to embodiment 2 of the present invention. Parts in FIG. 5 that are the same as in FIG. 4 will be assigned the same reference numerals as in FIG. 4 and their detailed explanations will be omitted.

The reception apparatus illustrated in FIG. 5 is comprised mainly of antennas 401a and 401b, RF reception circuits 402a and 402b, CP removal sections 403a and 403b, FFT sections 404a and 404b, a reception timing estimation section 405, a channel estimation section 406, a signal separation section 501, channel decoding sections 408a and 408b, an error determining section 502, a coding section 503, and a replica generation section 504. Here, a signal including CW #1 is received via the antenna 401a, and a signal including CW #2 is received via the antenna 401b.

The signal separation section 501 performs processing of separating the CWs from the received signals. The signal separation section 501 has a CW #1 MLD signal separation section 5011 that performs MLD-based signal separation in CW #1, a CW #1 signal canceller 5012 that performs SIC-based signal separation between CWs, and a CW #2 signal canceller 5013 that performs MLD-based signal separation in CW #2. Although one signal separation section 501 is illustrated in FIG. 5 for ease of description, but in fact signal separation section 501 is provided for every subcarrier.

The CW #1 MLD signal separation section 5011 performs maximum likelihood detection with the CW #1 signal after the FFT. That is to say, from symbol phases of all patterns of CW #1 and the channel estimated values acquired in the channel estimation section 406, the CW #1 MLD signal separation section 5011 generates symbol replicas for each pattern. Then, the CW #1 MLD signal separation section 5011 calculates the Euclidean distances between the symbol replicas of each pattern and the CW #1 signal after the FFT, adds up the Euclidean distances calculated with respect to all symbols as a metric, and reconstructs the symbol replicas that make the cumulative metric the minimum as the CW #1 signal. This CW #1 signal is output to the channel decoding section 408a. The channel decoding section 408a reconstructs the CW #1 signal by performing channel decoding on the CW #1 signal after MLD. The channel decoding section 408a outputs the reconstructed CW #1 signal after MLD to the error determining section 502.

The error determining section 502 performs error determination (hard decision) with respect to the reconstructed CW #1 signal, that is to say, determines whether or not there are frame errors, and outputs the hard decision result (hard decision decoded data) to the coding section 503. The coding section 503 encodes the hard decision decoded data and outputs the hard decision decoded data to the replica generation section 504. With encoded CW #1 data, the replica generation section 504 performs re-modulation and serial-parallel conversion processing and multiplies by each subcarrier's channel estimated value, thereby generating a CW #1 signal replica (CW #1 signal before channel decoding). The replica generation section 504 outputs that replica to the CW #1 signal canceller 5012.

The CW #1 signal canceller 5012 removes the replica of the CW #1 signal acquired from the replica generation section 504, from the signal received via the antenna 401a and the signal received via the antenna 401b. The CW #1 signal canceller 5012 outputs the signal from which the CW #1 signal has been removed, to CW #2 MLD signal separation section 5013.

The CW #2 MLD signal separation section 5013 performs maximum likelihood detection with the CW #2 signal after the FFT. That is to say, from symbol phases of all patterns of CW #2 and the channel estimated values acquired in the channel estimation section 406, the CW #2 MLD signal separation section 5013 generates symbol replicas for each pattern. Then, the CW #2 MLD signal separation section 5013 calculates the Euclidean distances between the symbol replicas of each pattern and the CW #2 signal after the FFT, adds up the Euclidean distances calculated with respect to all symbols as a metric, and reconstructs the symbol replicas that make the cumulative metric the minimum as the CW #2 signal. This CW #2 signal is output to the channel decoding section 408b. The channel decoding section 408b reconstructs the CW #2 signal by performing channel decoding on the CW #2 signal after MLD.

In this way, when, after MLD is performed with respect to a certain CW (here, CW #1) and there is no frame error after channel decoding, the reception apparatus of the above configuration performs SIC using its hard decision decoding result, and, after that, performs MLD with respect to another CW (here, CW #2).

Thus, the reception apparatus according to the present embodiment receives signals including a plurality of CWs transmitted by a plurality of streams, and performs maximum-likelihood detection-based signal separation in the same codeword in the received signals while performing continuous interference canceller-based signal separation between different codewords, so that it is possible to reduce the amount of operation processing, reduce the processing delay and allow high signal separation performance. That is to say, in CWs, signal separation of the highest accuracy is made possible by means of MLD processing (parallel processing), while, between CWs, by applying a canceller, the amount of operation processing is kept low compared to the case of signal separation all by MLD processing. By this means, it is possible to realize reduction of the amount of operation processing and high performance in a good balance. Although cases might occur where, due to application of an SIC canceller, differences in reception quality are created between CWs, it is still possible to compensate for such differences by AMC or HARQ control in CW units. As a result of this, by associating CWs and hybrid MIMO signal separation, it is possible to improve throughput efficiently.

Note that, for MLD processing, symbol replicas of all patterns of a CW are generated, and the correlations between the symbol replicas of each pattern and a CW signal after an FFT are subjected to in-phase addition averaging over a predetermined symbol period. It is equally possible to use joint MLD processing which reconstructs the symbol replicas that give the greatest correlation peak after in-phase addition averaging, as a CW signal.

Embodiment 3

With the present embodiment, for each CW, after maximum likelihood detection-based signal separation is performed, using the soft decision decoding result after channel decoding, continuous interference canceller-based signal separation is performed, and, after that, maximum likelihood detection-based signal separation is performed with respect to another CW. A case will be described here where the number of CWs is two.

Figure 6:
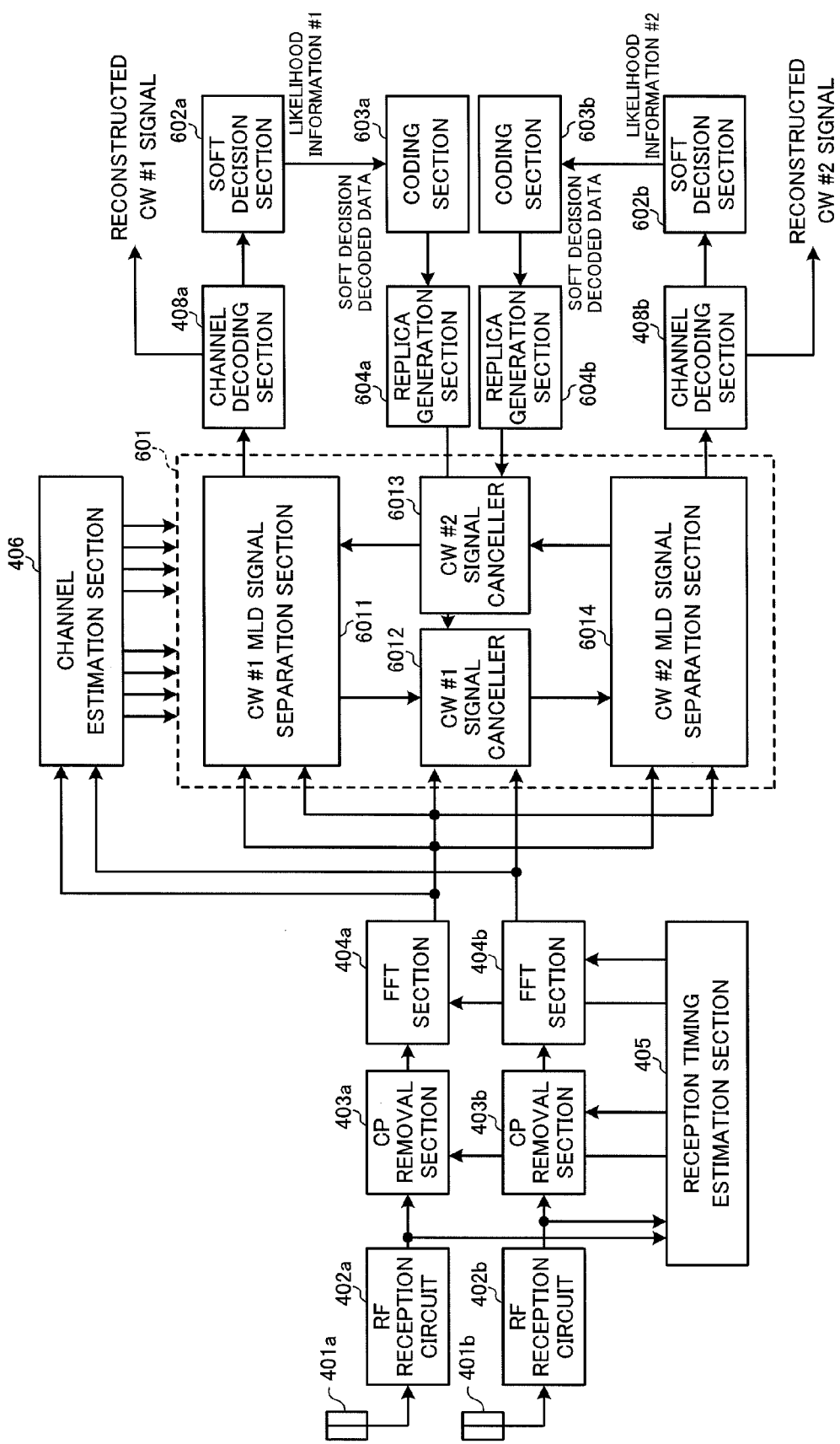
FIG. 6 is a drawing illustrating a schematic configuration of a reception apparatus according to embodiment 3 of the present invention.

FIG. 6 is a drawing illustrating a schematic configuration of a reception apparatus according to embodiment 3 of the present invention. Parts in FIG. 6 that are the same as in FIG. 4 will be assigned the same reference numerals as in FIG. 4 and their detailed explanations will be omitted.

The reception apparatus illustrated in FIG. 6 is mainly comprised of antennas 401a and 401b, RF reception circuits 402a and 402b, CP removal sections 403a and 403b, FFT sections 404a and 404b, a reception timing estimation section 405, a channel estimation section 406, a signal separation section 601, channel decoding sections 408a and 408b, soft decision sections 602a and 602b, coding sections 603a and 603b, and replica generation sections 604a and 604b. Here, a signal including CW #1 is received via the antenna 401a, and a signal including CW #2 is received via the antenna 401b.

The signal separation section 601 performs processing of separating the CWs from the received signals. The signal separation section 601 has a CW #1 MLD signal separation section 6011 that performs MLD-based signal separation in CW #1, a CW #1 signal canceller 6012 that performs SIC-based signal separation between CWs, a CW #2 signal canceller 6013 that performs SIC-based signal separation between CWs, and a CW #2 MLD signal separation section 6014 that performs MLD-based signal separation in CW #2. Although one signal separation section 601 is illustrated in FIG. 6 for ease of description, but in fact signal separation section 601 is provided for every subcarrier.

The CW #1 MLD signal separation section 6011 performs maximum likelihood detection with the CW #1 signal after the FFT. That is to say, from symbol phases of all patterns of CW #1 and the channel estimated values acquired in the channel estimation section 406, the CW #1 MLD signal separation section 6011 generates symbol replicas for each pattern. Then, the CW #1 MLD signal separation section 6011 calculates the Euclidean distances between the symbol replicas of each pattern and the CW #1 signal after the FFT, adds up the Euclidean distances calculated with respect to all symbols as a metric, and reconstructs the symbol replicas that make the cumulative metric the minimum as the CW #1 signal. This CW #1 signal is output to the channel decoding section 408a. The channel decoding section 408a reconstructs the CW #1 signal by performing channel decoding on the CW #1 signal after MLD. The channel decoding section 408a outputs the reconstructed CW #1 signal to the soft decision section 602a.

The soft decision section 602a performs soft decision with respect to the reconstructed CW #1 signal and outputs this soft decision result (soft decision decoded data: likelihood information #1) to the coding section 603a. The coding section 603a encodes the soft decision decoded data and outputs the soft decision decoded data to the replica generation section 604a. With soft decision decoded data of CW #1 after coding, the replica generation section 604a performs re-modulation and serial-parallel conversion processing and multiplies by each subcarrier's channel estimated value, thereby generating soft decision replica of a CW #1 signal (CW #1 signal before channel decoding). The replica generation section 604a outputs that soft decision replica to the CW #1 signal canceller 6012.

The CW #1 signal canceller 6012 removes the replica of the CW #1 signal acquired from the replica generation section 604a, from the signal received via the antenna 401a and the signal received via the antenna 401b. The CW #1 signal canceller 6012 outputs the signal from which the CW #1 signal has been removed, to the CW #2 MLD signal separation section 6014.

The CW #2 MLD signal separation section 6014 performs maximum likelihood detection with the CW #2 signal after the FFT. That is to say, from symbol phases of all patterns of CW #2 and the channel estimated values acquired in the channel estimation section 406, the CW #2 MLD signal separation section 6014 generates symbol replicas for each pattern. Then, the CW #2 MLD signal separation section 6014 calculates the Euclidean distances between the symbol replicas of each pattern and the CW #2 signal after the FFT, adds up the Euclidean distances calculated with respect to all symbols as a metric, and reconstructs the symbol replicas that make the cumulative metric the minimum as the CW #2 signal. This CW #2 signal is output to the channel decoding section 408b. The channel decoding section 408b reconstructs the CW #2 signal by performing channel decoding on the CW #2 signal after MLD.

The channel decoding section 408b outputs the reconstructed CW #2 signal to the soft decision section 602b. The soft decision section 602b performs soft decision with respect to the reconstructed CW #2 signal and outputs this soft decision result (soft decision decoded data: likelihood information #2) to the coding section 603b. The coding section 603b encodes the soft decision decoded data and outputs the soft decision decoded data to the replica generation section 604b. With soft decision decoded data of CW #2 data after coding, the replica generation section 604b performs re-modulation and serial-parallel conversion processing and multiplies by each subcarrier's channel estimated value, thereby generating soft decision replica of a CW #2 signal (CW #2 signal before channel decoding). The replica generation section 604b outputs that soft decision replica to the CW #2 signal canceller 6013.

The CW #2 signal canceller 6013 removes the replica of the CW #2 signal acquired from the replica generation section 604b, from the signal received via the antenna 401a and the signal received via the antenna 401b. The CW #2 signal canceller 6013 outputs the signal from which the CW #2 signal has been removed, to CW #1 MLD signal separation section 6011. The CW #1 MLD signal separation section 6011 performs maximum likelihood detection for the CW #1 signal after the FFT and reconstructs the CW #1 signal. With the present embodiment, it is preferable to repeat MLD for each CW, and SIC between CWs, a plurality of times. By this means, it is possible to improve the accuracy of signal separation.

In this way, the reception apparatus of the above configuration performs SIC using a soft decision decoding result after channel decoding after MLD is performed with respect to each CW, and, after that, performs MLD with respect to another CW.

Thus, the reception apparatus according to the present embodiment receives signals including a plurality of CWs transmitted by a plurality of streams, and performs maximum-likelihood detection-based signal separation in the same CW in the received signals while performing continuous interference canceller-based signal separation between different CWs, so that it is possible to reduce the amount of operation processing, reduce the processing delay and allow high signal separation performance. That is to say, in CWs, signal separation of the highest accuracy is made possible by means of MLD processing (parallel processing), while, between CWs, by applying a canceller, the amount of operation processing is kept low compared to the case of signal separation all by MLD processing. By this means, it is possible to realize reduction of the amount of operation processing and high performance in a good balance. Although cases might occur where, due to application of an SIC canceller, differences in reception quality are created between CWs, it is still possible to compensate for such differences by AMC or HARQ control in CW units. As a result of this, by associating CWs and hybrid MIMO signal separation, it is possible to improve throughput efficiently.

Note that, for MLD processing, symbol replicas of all patterns of a CW are generated, and the correlations between the symbol replicas of each pattern and a CW signal after an FFT are subjected to in-phase addition averaging over a predetermined symbol period. It is equally possible to use joint MLD processing which reconstructs the symbol replicas that give the greatest correlation peak after in-phase addition averaging, as a CW signal.

In above embodiments 1 to 3, for MLD, it is possible to use operation processing amount reduction-based MLD. For operation processing amount reduction-based MLD, Sphere decoding and an MLD separation method to use QR decomposition and M algorithm may be possible. By this means, it is possible to further reduce the amount of operation processing.

K. J. Kim et al., "A QRD-M/Kalman filter-based detection and channel estimation algorithm for MIMO-OFDM systems", IEEE Trans. On Wireless Commun., vol. 4, no. 2, pp. 710-721, March, 2005, discloses Sphere decoding, which is one operation reduction-based MLD method.

Also, Maeda, Higuchi, Kawai, and Sawahashi, "Sphere Decoding Using Adaptive Selection of Surviving Symbol Replica Candidates for OFDM MIMO Multiplexing," The Institute of Electronics Information and Communication Engineers, IEICE Technical Report, RCS2004-222, pp. 67-72, November, 2004, discloses an MLD separation method using QR decomposition and M algorithm, which is one operation reduction-based MLD method. The contents of these are entirely incorporated herein.

The present invention is by no means limited to above embodiment 1 to embodiment 3 and can be implemented in various modifications. For example, there are no particular limitations as to the radio access scheme with the present invention, and the present invention is applicable to OFDM and SC-FDMA, and also is equally applicable to other radio access schemes as well. Furthermore, the present invention is applicable to arbitrary cases where the maximum number of streams and the number of codewords are different. Also, without departing from the spirit of the present invention, it is possible to change the number of processing parts and the steps of processing in the above description as appropriate. Parts illustrated in the drawings each have functions, and each block may be implemented by hardware or may be implemented by software. Addition modifications are also possible as appropriate without departing from the spirit of the present invention.

INDUSTRIAL APPLICABILITY

The present invention is applicable to a reception apparatus in an LTE system or LTE-A system.

The disclosure of Japanese Patent Application No. 2009-263958, filed on Nov. 19, 2009, including the specification, drawings, and abstract, is incorporated herein by reference in its entirety.

The invention claimed is:

1. A reception apparatus comprising:
a reception section configured to receive signals including a plurality of codewords transmitted by a plurality of streams; and
a signal separation section configured to separate the codewords from the received signals, wherein the signal separation section comprises:
a maximum likelihood detection signal separation section configured to perform maximum likelihood detection-based signal separation in a same codeword; and
a continuous interference canceller signal separation section configured to perform continuous interference canceller-based signal separation between different codewords;
wherein, when, after maximum likelihood detection-based signal separation is performed with respect to a certain codeword and there is no frame error after channel decoding, the signal separation section performs continuous-interference canceller-based signal separation using a hard decision decoding result, and, after that, performs maximum likelihood detection-based signal separation with respect to another codeword.

2. A reception apparatus comprising:
a reception section configured to receive signals including a plurality of codewords transmitted by a plurality of streams; and
a signal separation section configured to separate the codewords from the received signals,
wherein the signal separation section comprises:
a maximum likelihood detection signal separation section configured to perform maximum likelihood detection-based signal separation in a same codeword; and
a continuous interference canceller signal separation section configured to perform continuous interference canceller-based signal separation between different codewords;
wherein, with respect to each codeword, the signal separation section performs continuous interference canceller-based signal separation using a soft decision decoding result after channel decoding after maximum-likelihood detection-based signal separation is performed, and, after that, performs maximum likelihood detection-based signal separation with respect to another codeword.

3. The reception apparatus according to claim 2, wherein maximum likelihood detection-based signal separation with respect to each codeword and continuous interference canceller-based signal separation between codewords are performed a plurality of times.

4. A reception method comprising:
a reception step of receiving signals at a reception apparatus, including a plurality of codewords transmitted by a plurality of streams; and
a signal separation step of separating the codewords from the received signals in the reception apparatus,
wherein the signal separation step comprises:
a maximum likelihood detection signal separation step of performing maximum likelihood detection-based signal separation in a same codeword; and
a continuous interference canceller signal separation step of performing continuous interference canceller-based signal separation between different codewords;
wherein, in the signal separation step, when, after maximum likelihood detection-based signal separation is performed with respect to a certain codeword and there is no frame error after channel decoding, continuous-interference canceller-based signal separation is performed using a hard decision decoding result, and, after that, maximum likelihood detection-based signal separation is performed with respect to another codeword.

5. A reception method comprising:
a reception step of receiving signals at a reception apparatus, including a plurality of codewords transmitted by a plurality of streams; and
a signal separation step of separating the codewords from the received signals in the reception apparatus,
wherein the signal separation step comprises:
a maximum likelihood detection signal separation step of performing maximum likelihood detection-based signal separation in a same codeword; and
a continuous interference canceller signal separation step of performing continuous interference canceller-based signal separation between different codewords;
wherein, in the signal separation step, with respect to each codeword, continuous interference canceller-based signal separation is performed using a soft decision decoding result after channel decoding after maximum-likelihood detection-based signal separation is performed, and, after that, maximum likelihood detection-based signal separation is performed with respect to another codeword.

6. The reception method according to claim 5, wherein maximum likelihood detection-based signal separation with respect to each codeword and continuous interference canceller-based signal separation between codewords are performed a plurality of times.

* * * * *